United States Patent [19]

Kaczur et al.

[11] 4,354,942

[45] Oct. 19, 1982

[54] STABILIZATION OF MERCURY IN MERCURY-CONTAINING MATERIALS

[75] Inventors: Jerry J. Kaczur, Cleveland; James C. Tyler, Jr., Athens; John J. Simmons, Cleveland, all of Tenn.

[73] Assignee: Olin Corporation, New Haven, Conn.

[21] Appl. No.: 210,493

[22] Filed: Nov. 26, 1980

[51] Int. Cl.$^3$ .................... B09B 1/00; C02F 1/62
[52] U.S. Cl. .................... 210/712; 210/723; 210/747; 210/751; 210/914; 405/129; 210/901
[58] Field of Search .......... 210/914, 702, 712, 717, 210/719, 723, 747, 751, 757, 765; 405/128, 129

[56] References Cited

U.S. PATENT DOCUMENTS

| 3,674,428 | 7/1972 | Dean et al. | 210/914 X |
| 3,804,751 | 4/1974 | McCord et al. | 210/914 X |
| 4,053,401 | 10/1977 | Fukushima et al. | 210/914 X |

FOREIGN PATENT DOCUMENTS 48-69721  9/1973 Japan .
50-80268  6/1975 Japan .................... 210/914
50-105541 8/1975 Japan .
53-124164 10/1978 Japan .

*Primary Examiner*—Thomas G. Wyse
*Attorney, Agent, or Firm*—James B. Haglind; Donald F. Clements

[57] ABSTRACT

A process for stabilizing in situ soluble mercury in deposits of mercury-containing materials which comprises treating the deposits with a stabilizing amount of an inorganic sulfur compound. Suitable inorganic sulfur compounds include sulfides, alkali metal thiosulfates, alkaline earth metal thiosulfates, iron thiosulfates, alkali metal dithionites, and alkaline earth metal dithionites. These inorganic sulfur compounds react with soluble mercury to convert it to insoluble mercury compounds and substantially inhibit its removal by elution with water from the deposits of mercury-containing material.

The process may be used to treat land areas, landfill deposits, or submarine sediment deposits to reduce soluble mercury concentrations to a few parts per billion.

18 Claims, No Drawings

STABILIZATION OF MERCURY IN MERCURY-CONTAINING MATERIALS

This invention is related to the stabilization of mercury in mercury-containing materials. More particularly, this invention is related to the treatment of mercury-containing materials with selected inorganic sulfur compounds to prevent the removal or leaching of soluble mercury from these materials.

The treatment of mercury-containing materials with chemical reagents to selectively remove soluble mercury is well known. For example, it is known to treat mercury-containing materials with metal sulfides to precipitate mercury sulfide compositions from these materials before they are further processed. However, where soluble mercury is present in materials such as landfill deposits, sediments, etc., it is often physically and economically impractical to attempt to remove mercury from these materials. Mercury-containing effluents from these deposits may undesirably further contaminate water supplies or other land areas.

It is an object of the present invention to provide a process for stabilizing in situ soluble mercury in deposits of mercury-containing materials.

Another object of the present invention is to provide a process to prevent the leaching of soluble mercury from deposits of mercury-containing materials.

A further object of the present invention is to provide a process for readily applying chemical reagents to deposits of mercury-containing materials to stabilize soluble mercury.

These and other objects of the invention are accomplished in a process for stabilizing in situ soluble mercury in deposits of mercury-containing materials which comprises applying to the mercury-containing materials a stabilizing amount of an inorganic sulfur compound selected from the group consisting of sulfides, alkali metal thiosulfates, alkaline earth metal thiosulfates, iron thiosulfates, alkali metal dithionites and alkaline earth metal dithionites and mixtures thereof, which react with the soluble mercury to convert it to insoluble mercury compounds and substantially inhibit its removal by elution from the deposits of the mercury-containing materials.

The mercury-containing materials treated by the novel process of the present invention may be obtained from any operation which employs mercury or mercury compounds and which generates mercury-containing waste materials. Mercury-containing inorganic materials are, for example, generated during the operation of mercury cathode electrolytic cells. These cells are employed in the commercial production, for example, of chlorine and alkali metal hydroxide solutions. During the operation of mercury cells, mercury-containing waste materials are formed, for example, as thick mercury wastes or as caustic sludges. Thick mercury wastes are formed during the treatment of thick mercury (mercury butter), as described, for example, in U.S. Pat. No. 2,854,344 issued to W. J. Sakowski, to recover as much of the mercury as possible for re-use in the electrolytic cell. Mercury-containing materials also result from the treatment of mercury-containing caustic sludges generated during the filtering of concentrated solutions of alkali metal hydroxides. One such method of treatment for caustic sludges is described in U.S. Pat. No. 4,149,879 issued Apr. 17, 1979, to W. M. Loo.

The mercury-containing materials remaining after these Hg recovery treatments have been deposited in waste ponds or landfill areas, however, contain soluble mercury which can be eluted or leached out of the deposits by rainfall or ground water in effluents which may enter public or private water supplies.

To substantially prevent the elution of soluble mercury from these and other mercury-containing materials, the process of the present invention stabilizes these mercury-containing materials by the application of an inorganic sulfur compound to form insoluble mercury compounds.

Soluble mercury found in mercury-containing materials includes ionic mercury, dissolved metallic mercury, and other water soluble mercury compounds. Preferably treated by the process of the present invention are mercury-containing materials containing ionic mercury or dissolved metallic mercury.

One suitable group of inorganic sulfur compounds are sulfide compounds including, for example, nitrogen-containing sulfides such as ammonium sulfides or nitrogen sulfides; alkali metal sulfides including potassium sulfides, and sodium sulfides; alkaline earth metal sulfides such as calcium sulfides, strontium sulfides, and barium sulfides; transition metal sulfides of elements 25 to 30 including manganese sulfides, iron sulfides, cobalt sulfides, nickel sulfides, copper sulfides, and zinc sulfides; Group IV sulfides such as carbon disulfide, germanium sulfides, tin sulfides, lead sulfides and titanium sulfides as well as aluminum sulfides, cadmium sulfides, and antimony sulfides.

It is desirable that sulfide compounds used have a solubility in water greater than that of mercury sulfides. When the mercury-containing materials are treated with these sulfide compounds, soluble mercury reacts to form insoluble mercury sulfides which are retained in the mercury-containing deposits along with any other insoluble forms of mercury which may be present.

Monosulfide, disulfide, and trisulfide compounds of the above elements may be employed. Monosulfide compounds are preferred as their use reduces the possibility of producing undesirable amounts of mercury polysulfide complexes.

Also suitable as inorganic sulfur compounds in the process of the present invention are oxygen-containing compounds such as thiosulfates and dithionites. For example, alkali metal thiosulfates, alkaline earth metal thiosulfates, iron thiosulfates, alkali metal dithionites, and alkaline earth metal dithionites and mixtures thereof can be employed to insolubilize soluble mercury. Suitable alkali metal thiosulfates include sodium thiosulfate, potassium thiosulfate, and lithium thiosulfate. Alkaline earth metal thiosulfates which may be employed include calcium thiosulfate and magnesium thiosulfate. Ferric thiosulfate exemplifies an iron thiosulfate which may be employed. Alkali metal dithionites including, for example, sodium dithionite and potassium dithionite are suitable stabilizing agents as are alkaline earth metal dithionites such as calcium dithionite.

It is believed that the thiosulfate and dithionite compounds react with soluble mercury to form mercury sulfides in a manner similar to that of the sulfide compounds.

Any suitable amounts of these inorganic sulfur compounds may be used which will effectively stabilize the soluble mercury in the mercury-containing materials.

Stabilizing amounts employed are related, for example, to the solubility of the inorganic sulfur compounds in water. For example, stabilizing agents which are relatively soluble in water such as alkali metal sulfides, nitrogen sulfides, alkali metal thiosulfates, alkaline earth metal thiosulfates, iron thiosulfate, and alkali metal dithionites employ stabilizing amounts which include, for example, molar ratios of the inorganic sulfur compound to soluble mercury in the mercury-containing materials from about 1:1 to about 5,000:1, preferably from about 10:1 to about 3000:1 and more preferably from about 100:1 to about 2000:1. Stabilizing amounts employed for less soluble inorganic sulfur compounds such as alkaline earth metal sulfides, transition metal sulfides of elements 25 to 30, Group IV sulfides, cadmium sulfides, and antimony sulfides can include molar ratios of the inorganic sulfur compound to soluble mercury in the mercury-containing materials of from about 5:1 to about 20,000:1, and preferably from about 50:1 to about 10,000:1. Higher molar ratios of the inorganic sulfur compound than those given above may be employed, if desired, however, excessive amounts of these compounds may result in the formation of undesirable amounts of mercury polysulfide complexes which have a much higher solubility in water than the insoluble mercury sulfides formed. Thus the mercury polysulfide complexes can be more easily eluted from the stabilized deposits.

The application of the inorganic sulfur compound to deposits of mercury-containing materials may be carried out in a variety of ways. One method, for example, is to spread or blow the inorganic sulfur compound on the surface of mercury-containing areas such as land areas, landfill deposits, the water covering submarine deposits of mercury-containing material, or the land area surrounding these water-covered sediments. For mercury-containing land areas, spreading the stabilizing agent includes, for example, plowing, discing, or other such means of applying the inorganic sulfur compound into the upper layers of the area. The stabilizing agent is carried into the deposits by water in the form of rain fall or water applied to these areas, for example, by spraying or irrigation means.

Where the sulfide compound is applied to the surface of a mercury impregnated land area, or to the surface of a water body such as a waste treatment pond containing a sediment containing mercury, or the land surrounding the water body, inorganic sulfur compounds are often selected which are resistant to decomposition reactions which generate hydrogen sulfide. Where mercury-containing materials are added periodically, the sulfur compounds having a low order of solubility in water are preferred so that the frequency of application can be minimized. Surface application of the sulfur compounds can utilize, for example, rainfall or water distribution devices to disperse the stabilizing agent into the sediment or deposit. Where porosity or surface tension properties of the mercury-containing deposit would limit penetration of the stabilizing agent, dispersing agents can be employed to aid in carrying the inorganic sulfur compound into the deposit and dispersing it throughout the deposit. Suitable dispersing agents include, for example, wetting agents, surfactants and chelating agents. Examples of dispersing agents which can be used include:

1. Anionic dispersing agents such as the sulfonates, the phosphate esters and salts, the sulfonic acids and salts, and the carboxylic acids and salts.
2. Nonionic dispersing agents such as the carboxylic amides, the ethoxylated aliphatic alcohols, and the ethoxylated alkyphenols.
3. Cationic dispersing agents such as the amines, the quaternary ammonium salts, and others.

Where surface applications of the sulfur compounds are employed in treating mercury-containing materials, suitable rates of application of the inorganic sulfur compound include, for example, those from about 0.05 to about 10.0, and preferably from about 0.2 to about 5.0 kilograms per square meter of surface area.

Where a dispersing agent is used any suitable amounts can be employed. For example, amounts of dispersing agent in the range of from about 0.5 to about 50 percent by weight of the inorganic sulfur compound.

Preferred embodiments for surface application to deposits of mercury-containing materials include the potassium sulfides, sodium thiosulfate, calcium thiosulfate, and sodium dithionite as inorganic sulfur compounds having a solubility in cold water of greater than 1 grams per liter.

Inorganic sulfur compounds which have a solubility of less than 1 gram per liter in cold water include as preferred embodiments the calcium sulfides, the zinc sulfides, and the iron sulfides.

Mixtures of the inorganic sulfur compounds can be used in stabilizing soluble mercury in mercury-containing deposits where desired. For example, mixtures which include a relatively soluble inorganic sulfur compound with a less soluble stabilizing agent, such as mixtures of potassium sulfide and calcium sulfide; calcium sulfide and calcium thiosulfate; potassium sulfide and zinc sulfide; sodium dithionite and calcium sulfide; etc.

Inorganic sulfur compounds can be used to stabilize mercury-containing deposits which have, for example, limited penetrability, or where the mercury-containing material is a distance below the surface by introducing the stabilizing agent directly into the the deposits. Any suitable means of introducing the stabilizing agent may be used as high pressure liquid/solid injectors commonly used for fertilizer subsurface application. For deeper deposits, injection methods and equipment commonly used in hydrology and petroleum technology may be employed.

When mercury-containing deposits, treated by the novel process of the present invention to convert soluble mercury into insoluble mercury, are contacted with, for example, water in the form of rainfall or ground water, the amount of mercury removed by elution or leaching is substantially reduced. For example, where the soluble mercury is present in concentrations of parts per million, employment of the process of the present invention will reduce its concentration to less than about 20 parts per billion and preferably in the range of from about 0.01 to about 10 parts per billion. Effluents from the stabilized deposits thus contain concentrations of soluble mercury which if accidentally released, for example, into water bodies such as rivers, would be ecologically acceptable.

In the stabilization of soluble mercury in mercury-containing materials by the formation of insoluble mercury sulfides, it is desirable to minimize the formation of mercury polysulfide complexes which can be eluted or leached from deposits in effluents which would contain Hg concentrations higher than desired. This can be accomplished by the judicious selection of the inorganic sulfur compound employed. Mercury polysulfide formation may also be minimized or eliminated by the addition of a polysulfide inhibitor. Suitably used as polysulfide inhibitors are inorganic sulfites and bisulfite compounds. For example, alkali metal sulfites, alkali metal bisulfites and alkali metal metabisulfites may be employed as polysulfide inhibitors The amounts of polysulfide inhibitors used may be any amounts which prevent or minimize mercury polysulfide formation. For example, suitable amounts of polysulfide inhibitor based on the weight of inorganic sulfur compounds employed, include those in the range of from about 5 to about 50 percent.

Similarly, it is desirable to prevent or minimize the formation of hydrogen sulfide in treating the mercury-containing materials. One way in which this can be accomplished is to limit the amounts of hydrogen-containing sulfur compounds present as impurities in the inorganic sulfur compounds as they tend to be less stable than the corresponding monosulfides. Hydrogen sulfide formation can also be minimized by limiting the exposure of the stabilizing inorganic sulfur compounds to air and sunlight. The use of antioxidants will also reduce hydrogen sulfide formation in the application and stabilization process. Suitable antioxidants include, for example, ascorbic acid, citric acid, phosphoric acid, butylated hydroxyanisole (BHA), and butylated hydroxytoluene (BHT). Antioxidants may be applied to the deposits of mercury-containing materials prior to treatment with the stabilizing agent or admixed with the stabilizing agent and then applied to the deposits. Any suitable amounts of the antioxidants may be used, such as those in the range of from about 0.01 to about 10 percent by weight of the inorganic sulfur compound.

While any soluble mercury-containing material may be treated by the novel process of the present invention, it is preferred that highly acidic materials first be treated with a base such as lime or caustic soda to bring the pH of the deposit within the range of from about 4 to about 14. Preferably the pH of the mercury-containing materials is within the range of from about 6 to about 13.

Soluble mercury-containing materials such as sludges, sediments and land fill deposits treated by the process of the present invention are primarily solids or slurries where the materials have a solids content of at least 20 percent by weight. Preferably the mercury-containing materials have a solids content in the range of from about 25 to about 100 percent by weight. While the liquid present is usually water, other liquids including non-aqueous solvents may be present in the deposits. Water present in the deposits or applied to them during the treatment is at ambient temperatures, i.e., below about 40° C. and preferably in the range of from about 10° to about 25°.

In one embodiment of the present invention, effluent from mercury-containing deposits are recovered. The effluents are recycled to provide at least a portion of the water employed in dispersing the stabilizing agent through the deposits. Where the effluents contain residual amounts of the stabilizing agent, these residual amounts can be used to reduce the amount of stabilizing agent required in application of the process of the present invention.

For example, inorganic sulfur compounds such as potassium sulfides, sodium thiosulfate and sodium dithionite are readily dispersed throughout the deposits by water employed in this application. Effluents from these stabilized mercury-containing deposits contain residual amounts of the stabilizing agents. Recycling these effluents recovers stabilizing agent values and is economically beneficial. Recycling effluents from the deposits containing soluble mercury is also ecologically beneficial where the effluents contain higher concentrations of soluble mercury than are desired. Recycling of the effluents can be discontinued when the soluble mercury concentration is at acceptable levels.

Employing the novel process of the present invention, it is possible to stabilize mercury-containing materials by converting the soluble mercury present into substantially insoluble mercury. This process permits in situ treatment of sludges, land areas, landfill deposits and submarine sediments to minimize the elution or leaching of soluble mercury by rainfall or ground water to where liquid effluents from these materials contain a few parts per billion of Hg or less.

The following examples are presented to further illustrated the novel process of the present invention without any intention of being limited thereby. All parts and percentages are by weight unless otherwise indicated.

EXAMPLES 1–5

An inorganic mercury-containing sludge (850 grams) was added to a cylindrical reaction vessel 7.6 centimeters in diameter and filled to a depth of 30.5 centimeters deep with sludge. The inorganic waste sludge was primarily a mixture of calcium carbonate, calcium hydroxide, and calcium sulfate with minor amounts of other salts. The sludge had a total solids contents of 55.6 percent, a pH in the range of 11 to about 11.5 and a total mercury content of 35.23 parts per million of which 4.5 parts per million were soluble mercury. The sludge was initially flushed by the addition of 600 milliliters of demineralized water to the column. The effluent was collected and the total mercury and the soluble mercury concentrations were measured using an LDC mercury monitor. The inorganic sulfur compound stabilizing agent in dry form was sprinkled on the upper surface of the sludge. The application rate of the stabilizing agent in kilograms per square meter is given in Table I below. Demineralized water (600 mls) was added to the top of the column and the effluent collected and both total insoluble mercury concentrations in the effluent determined. The flushing procedure was periodically repeated each time using 600 milliliters of water. After each flushing, the effluent was collected and the total mercury and soluble mercury concentrations determined. When the concentration of soluble Hg reached a level of 20 PPB and then 10 PPB in the effluent, the volumes of water added to obtain these concentrations were recorded. The flushing procedure was discontinued after a total of 8.4 liters of water had been flushed through the column. The effluent from the final addition water was collected and the total Hg and soluble Hg concentrations were determined and recorded. Experimental results are included in Table I below.

COMPARATIVE EXAMPLE A

The procedure of EXAMPLES 1–5 was duplicated exactly with the exception that a stabilizing agent was not used. The experimental results are given in Table I below.

Using the novel process of the present invention for stabilizing soluble mercury in mercury-containing materials, it was possible to reduce the soluble mercury concentrations in effluents from the mercury-containing sludge by at least 55 percent and as high as 90 percent over those Hg concentrations found in the effluents from the untreated sludge of Comparative Example A.

In addition, the total mercury concentration in the effluents from columns containing the stabilizing inorganic sulfur compounds of Examples 1–5 were reduced at least 50 percent to as high as 90 percent over the total mercury concentrations found in the effluent of Comparative Example A.

As shown in Table II, the novel process of the present invention for stabilizing soluble mercury in mercury-containing materials was able to reduce the soluble mercury concentration in effluents from the sludge from at least 70 to 95 percent over that of effluents from untreated sludge in Comparative Example B.

TABLE I

STABILIZATION OF INORGANIC SLUDGES CONTAINING SOLUBLE HG
SLUDGE CONCENTRATION: TOTAL HG 35.23 PPM - SOLUBLE HG 4.50 PPM

EFFLUENT ANALYSIS (PPB)

| Example No. | Stabilizing Agent | Application Rate ($Kg/m^2$) | START Total Hg | START Soluble Hg | Liters $H_2O$ Throughput to Attain Specified Soluble Hg in Effluent $\leq$20 PPB | Liters $H_2O$ Throughput to Attain Specified Soluble Hg in Effluent $\leq$10 PPB | FINISH Total Hg | FINISH Soluble Hg |
|---|---|---|---|---|---|---|---|---|
| 1 | CaS | 0.269 | 500 | 390 | 3.6 | 4.2 | 10 | 10 |
| 2 | CaS | 0.538 | 440 | 390 | 3.6 | 4.8 | 6 | 3 |
| 3 | CaS | 1.076 | 470 | 430 | 1.8 | 4.2 | 4 | 4 |
| 4 | $K_2S$ | 0.538 | 450 | 360 | 1.8 | 3.0 | 6 | 4 |
| 5 | $Na_2S_2O_3$ | 0.538 | 510 | 420 | 2.4 | 2.4 | 23 | 13 |
| Comp. Ex.A | None | — | 460 | 340 | — | — | 40 | 30 |

Column Depth: 30.5 cm
Hg Analysis Detection Limit: 2 PPB

TABLE II

STABILIZATION OF INORGANIC SLUDGES CONTAINING SOLUBLE HG
SLUDGE CONCENTRATIONS: TOTAL HG 35.23 PPM - SOLUBLE HG 4.50 PPM

EFFLUENT ANALYSIS (PPB)

| Example No. | Stabilizing Agent | Application Rate ($Kg/m^2$) | START Total Hg | START Soluble Hg | Liters $H_2O$ Throughput to Attain Specified Soluble Hg in Effluent $\leq$20 PPB | Liters $H_2O$ Throughput to Attain Specified Soluble Hg in Effluent $\leq$10 PPB | FINISH Total Hg | FINISH Soluble Hg |
|---|---|---|---|---|---|---|---|---|
| 6 | CaS | 0.538 | 490 | 420 | 7.8 | 9.0 | 10 | 8 |
| 7 | CaS | 1.076 | 490 | 460 | 6.0 | 7.8 | 4 | 3 |
| 8 | CaS | 2.153 | 340 | 320 | 5.4 | 9.0 | 6 | 5 |
| 9 | $K_2S$ | 0.538 | 370 | 200 | 4.2 | — | 23 | 17 |
| 10 | $K_2S$ | 1.076 | 490 | 270 | 3.0 | 3.0 | 6 | 4 |
| 11 | $Na_2S_2O_3$ | 0.538 | 218 | 126 | 4.2 | 12.6 | 8 | 4 |
| Comp. Ex. B | None | — | 530 | 510 | — | — | 240 | 60 |

Column Depth: 61 cm
Hg Analysis Detection Limit: 2 PPB

EXAMPLES 6–11

The mercury-containing sludge (2200 grams) employed in EXAMPLES 1–5 was added to a column having a diameter of 7.6 centimeters and filled to a depth of 61 centimeters with sludge. Initially the column was flushed with 1200 mls of water. To the top of the column the stabilizing agents were applied in the concentrations given in Table II below. The procedure of EXAMPLES 1–5 was followed exactly. After each addition of 600 mls of $H_2O$, the effluent was collected and the total and soluble Hg concentrations determined. As in EXAMPLES 1–5, when the concentration of soluble Hg reached a level of 20 ppb and 10 ppb respectively in the effluent the volumes of water added to the column to attain these concentrations were recorded. A total of 15.0 liters of water was flushed through the column.

Identification of the stabilizing agents and their concentrations application rates are recorded in Table II below.

COMPARATIVE EXAMPLE B

The procedure of EXAMPLES 6–11 was reproduced exactly with the exception that a stabilizing agent was not employed. The experimental results are included in Table II below.

What is claimed is:

1. A process for stabilizing in situ soluble mercury in land or submarine deposits having mercury-containing materials which comprises applying to said deposits a stabilizing amount of an inorganic sulfur compound selected from the group consisting of potassium sulfide, alkaline earth metal sulfides, sulfides of transition elements number 25–30, aluminum sulfides, cadmium sulfides, antimony sulfides, Group IV sulfides, alkali metal thiosulfates, alkaline earth metal thiosulfates, iron thiosulfates, alkali metal dithionites and mixtures thereof, which react with said soluble mercury to convert it to insoluble mercury compounds and substantially inhibit its removal by elution from said deposits.

2. The process of claim 1 in which said soluble mercury present in said deposits of mercury-containing material is selected from the group consisting of ionic mercury and metallic mercury and mixtures thereof.

3. The process of claim 2 in which said inorganic sulfur compound is an oxygen-containing compound selected from the group consisting of alkali metal thiosulfates, alkaline earth metal thiosulfates, iron thiosulfates, alkali metal dithionites, and mixtures thereof.

4. The process of claim 3 in which said inorganic sulfur compound is selected from the group consisting of alkali metal thiosulfates, alkaline earth metal thiosulfates and mixture thereof.

5. The process of claim 3 in which said inorganic sulfur compound is an alkali metal dithionite.

6. The process of claim 3 in which a mercury polysulfide formation inhibitor is admixed with the inorganic sulfur compound.

7. The process of claim 2 in which said inorganic sulfur compound is applied to the surface of said deposit.

8. The process of claim 7 in which an antioxidant is applied to said deposit.

9. The process of claim 2 in which said inorganic sulfur compound is applied to the surface of or land area surrounding a water body covering a soluble mercury-containing sediment, said inorganic sulfur compound being dispersed throughout said sediment by water present in or entering into said water body.

10. The process of claim 9 in which said sulfide compound is selected from the group consisting of alkaline earth metal sulfides and sulfides of transition elements number 25–30.

11. The process of claim 10 in which said sulfide compound is a calcium sulfide.

12. The process of claim 10 in which said sulfide compound is an iron sulfide or zinc sulfide.

13. The process of claim 11 or claim 12 in which a dispersing agent is admixed with said inorganic sulfur compound.

14. The process of claim 7 or claim 9 in which said inorganic sulfur compound is sodium thiosulfate.

15. The process of claim 2 in which said inorganic sulfur compound is injected into said deposit of mercury-containing materials.

16. A process for stabilizing in situ soluble mercury in land or submarine deposits having mercury-containing materials which comprises applying to said deposits a stabilizing amount of sodium sulfide admixed with a mercury polysulfide formation inhibitor.

17. The process of claim 6 or 16 in which said mercury polysulfide formation inhibitor is selected from the group consisting of alkali metal sulfites, alkali metal bisulfites, and alkali metal metabisulfites.

18. A process for stabilizing in situ soluble mercury in landfill deposits having mercury-containing materials which comprises:
(a) applying to said deposits a stabilizing amount of an inorganic sulfur compound selected from the group consisting of potassium sulfide, alkaline earth metal sulfides, sulfides of transition elements number 25–30, aluminum sulfides, cadmium sulfides, antimony sulfides, Group IV sulfides, alkali metal thiosulfates, alkaline earth metal thiosulfates, iron thiosulfates, alkali metal dithionites and mixtures thereof;
(b) applying an aqueous solution to said deposits to disperse said inorganic sulfur compound into said deposits, said inorganic sulfur compound reacting with said soluble mercury to form an insoluble mercury compound in said deposits, a portion of said solution leaving said deposits as an effluent;
(c) recovering said effluent from said deposits; and
(d) recycling said effluent to step (b).

* * * * *

UNITED STATES PATENT AND TRADEMARK OFFICE
CERTIFICATE OF CORRECTION

PATENT NO. : 4,354,942

DATED : October 19, 1982

INVENTOR(S) : Jerry J. Kaczur, James C. Tyler, Jr. and John J. Simmons

It is certified that error appears in the above-identified patent and that said Letters Patent is hereby corrected as shown below:

Column 1, line 61, delete "2,854,344" and insert --2,845,344--.

Column 4, line 3, after "ethoxylated" delete "alkyphenols" and insert --alkyl phenols--.

Column 4, line 21, delete "grams" and insert --gram--.

Column 4, line 38, after "into" delete "the".

Column 5, line 5, after "inhibitors" insert a period (.).

Column 6, lines 16-17, delete "illustrated" and insert --illustrate--.

Column 6, EXAMPLES 1-5, line 28, delete "contents" and insert --content--.

Signed and Sealed this

Twenty-fifth Day of January 1983

[SEAL]

Attest:

Attesting Officer

GERALD J. MOSSINGHOFF

Commissioner of Patents and Trademarks